United States Patent

[11] 3,629,659

[72] Inventor Sol Schneider
 Little Silver, N.J.
[21] Appl. No. 95,174
[22] Filed Dec. 4, 1970
[45] Patented Dec. 21, 1971
[73] Assignee The United States of America as represented by the Secretary of the Army

[54] GAS TUBE ISOLATOR AND CHARGING CIRCUIT FOR PULSE AMPLIFIERS IN PHASED ARRAYS
5 Claims, 2 Drawing Figs.

[52] U.S. Cl................................................... 317/51, 328/10
[51] Int. Cl..................................................... H02h 7/20
[50] Field of Search........................................... 317/51; 328/10; 307/108, 131

[56] References Cited
UNITED STATES PATENTS

| | | | |
|---|---|---|---|
| 2,571,027 | 10/1951 | Garner | 317/51 X |
| 2,928,956 | 3/1960 | Jones | 328/10 X |
| 3,519,886 | 7/1970 | Spencer et al. | 317/51 |
| 3,539,870 | 11/1970 | Schneider et al. | 317/51 |
| 3,539,871 | 11/1970 | Schneider et al. | 317/51 |

Primary Examiner—James D. Trammell
Attorneys—Harry M. Saragovitz, Edward J. Kelly, Herbert Berl and Charles F. Gunderson ABSTRACT: This disclosure relates to energy control and particularly to energy control for charging energy storage devices and for isolating and protecting multiple amplifier circuits operating from a common power supply. More particularly, this disclosure relates to the use of a gaseous tube as a switch for charging the energy storage capacitor bank of an individual pulse amplifier circuit or unit of a multiple unit system having a common power supply. This disclosure teaches the connection of a gaseous discharge tube as a switch between the common, main, power supply and the secondary energy storage capacitor bank of each of the pulse amplifier circuits; and the firing of the gaseous discharge tube to recharge the secondary capacitor bank between pulses. This disclosure also teaches the delay of the firing of the gaseous discharge tube under conditions such as those of a short circuit where firing could damage the individual circuit; or drain or damage the common power supply; or interfere with operation of other circuits using the same common power supply.

PATENTED DEC 21 1971    3,629,659

INVENTOR,
SOL SCHNEIDER

BY: Charles F. Lunderson AGENT
Harry M. Saragovitz,
Edward J. Kelly & Herbert Berl
ATTORNEYS.

GAS TUBE ISOLATOR AND CHARGING CIRCUIT FOR PULSE AMPLIFIERS IN PHASED ARRAYS

BACKGROUND OF THE INVENTION

Special types of circuits are needed to meet the problems of power supplies for the superpower systems used for microwave pulse transmission. These systems involve units of comparatively large size that handle voltages and currents during a pulse transmission that are considerably in excess of those encountered in conventional transmissions, and that approach the limits of conventional electronic circuitry. The RF transmitter tubes themselves are operating under values of voltages and conditions that are tolerable, instantaneously, but would be destructive in constant use.

These instantaneous conditions of operation, close to the thermal and electrical limits of the tube, make failure or faulting of the tube a very real possibility. The power requirements for a single-pulse transmission make it necessary to provide capacitor banks of comparable energy storage capabilities. This makes the power surges that accompany any failure or faulting of a magnitude that could completely destroy the tube or other elements of the circuit involved, unless it is adequately protected.

Protection is particularly needed in systems where a plurality of pulse transmitters are required and are supplied by a single, common, power supply. Such a situation occurs with a phased-array, radar transmitter that has an extremely large antenna with many radiating elements, each powered by a separate pulse transmitter. The transmitters may all be fired together or they may be fired in any sequence, or phase, necessary to have the desired effect on the transmitted beam. The problem is to provide protection against any individual short circuits and to minimize the damage that might be caused by a short circuit or fault in any one of the separate transmitters, as well as to keep the other transmitters, operating from this common power supply, as little affected as possible during a fault in any one of the transmitters.

A separate power supply could, of course, be provided for each of the pulse transmitters. This would solve the problem of isolation, but the cost and size of the separate power supplies would be prohibitively expensive. This would also be inefficient and it would not reduce the possibility of damage to the individual units. It is more desirable and more efficient to have a single, common, power supply with a main energy storage device in the form of a capacitor bank of sufficient capacity to supply the overall power requirements of the entire system.

The interference between the separate pulse transmitters and the effective distribution of energy can be further improved by connecting energy storage capacitor banks to each of the separate pulse transmitters to supplement the main capacitor bank and to provide the instantaneous energy needed during the pulse transmission at the actual location of the pulse transmitter. This further reduces jitter and electronic beam path instability due to the length of the lines between the main energy storage bank and the individual pulse transmitters, but it does not reduce the possibility of damage to the individual pulse transmitters.

When the pulse transmitters are operating from a common power supply, each of the units may be connected to the common power supply through an isolator. These isolators interrupt the discharge of the main capacitor bank into a faulting transmitter. The isolators can take various forms, the most common form having a passive component which may be merely a high-voltage fuse, with or without a circuit breaker. In the event of a fault, the fuse would blow, or the circuit breaker would open. This reduces the possibility of a sudden massive drain on the power supply and the corresponding effect on the other transmitters. However, this has the serious disadvantage of inactivating the circuit until the fuse is replaced or the circuit breaker is reset. Also, the fuse or circuit breaker may not act quickly enough to avoid an initial surge of current that might be sufficient to destroy the unit or to affect the stability of the common power supply.

One of the solutions to these problems is described in my U.S. Pat. No. 3,539,870 for a "Vacuum Tube Isolator Circuit Protector and Voltage Regulator." An example of this solution is shown in FIG. 1 and will be described with the prior art of this application. This circuit protector provides a vacuum tube connected between the main capacitor bank and each of the secondary capacitor banks for the individual circuits. The vacuum tube is controlled by a circuit that is actuated by a voltage sensor to cut off the supply of current from the main capacitor bank to the secondary capacitor bank in the event of and during a short circuit or fault; and to reconnect the main capacitor bank to the secondary capacitor bank at a given time after the short-circuited load has had time to recover itself.

However, even though this device operates with readily available, vacuum tubes, they are still not as cheap, nor as effective, nor as durable a source of high levels of current as gaseous discharge tubes, for example, would be, but gaseous discharge tubes cannot be used in this particular, vacuum tube circuit since they cannot be cut off once they are in a conductive state.

Another solution to these problems, that does use a gaseous type of tube, is seen in my U.S. Pat. No. 3,539,871 for a "Circuit Protecting, Gas Tube, Discharge Interrupter." Here a gaseous discharge tube is connected between the main capacitor bank and each of the secondary capacitor banks that supply the individual circuits. This is a special type of gaseous discharge tube, where the flow of current can be interrupted by a magnetic field that diverts the beam of current. The magnetic field is produced by inductors in close proximity to the gaseous discharge tube. The inductors are actuated by sensors and control circuits that respond to the effect of a short circuit or fault of the transmitting tube. However, this is a special tube that is relatively expensive and not as positive in operation as a conventional vacuum tube; or a gaseous discharge tube with conventional control elements.

The desirable solution to these problems would be to completely cut off each of the individual pulse transmitter circuits from the main capacitor bank, not only in the event of a fault, but during each pulse transmission, as well; and to reconnect each individual circuit to the main capacitor bank between pulses. The individual circuits would operate from their secondary capacitor banks during a pulse transmission, and the secondary capacitor banks would be recharged between pulses. This would automatically provide isolation in the event of a short circuit, and it would also eliminate the possibility of interference between the individual pulse transmitters and the rest of the circuits during pulse transmissions. This could not be done by the "Circuit-Protecting, Gas Tube, Discharge Interrupter" at all, not by the "Vacuum-Tube Isolator, Circuit Protector, and Voltage Regulator" without considerable changes.

It is therefore an object of this invention to provide a circuit for isolating and protecting each individual unit of a multiple, phased-array pulse transmitter, operating from a common power supply; for charging the secondary capacitor bank of each individual unit from the common power supply between pulses; and for protecting the common power supply in the event of a short circuit or fault in any individual unit.

SUMMARY OF THE INVENTION

A standard gaseous discharge tube is connected between the main capacitor bank of the energy storage means of a common power supply and the secondary capacitor bank of the energy storage means of each of the individual pulse-transmitting circuits associated with the common power supply. The gaseous discharge tube is fired by a control circuit that is actuated by a current sensor. In this device, the gaseous discharge tube extinguishes itself when the voltage of the charging secondary capacitor bank approaches the voltage of the main capacitor bank and the voltage across the anode and cathode electrodes of the gaseous discharge tube becomes too low to support its conducting mode. The gaseous discharge tube will not conduct again until there is sufficient voltage across its electrodes and until it is triggered by its control grid.

The extinguishing of the gaseous discharge tube completely disconnects the individual circuits from the common power supply and its main capacitor bank during the next pulse transmission. The control grid is not actuated to fire the gaseous discharge tube again until this next pulse transmission is quite completed. The control circuit can also delay the firing of the gaseous discharge tube for a longer interval in the event of an abnormal condition, such as a short circuit, to allow the shorted tube more time to recover.

DETAILED DESCRIPTION OF THE PREFERRED EMBODIMENT

Figure 1:
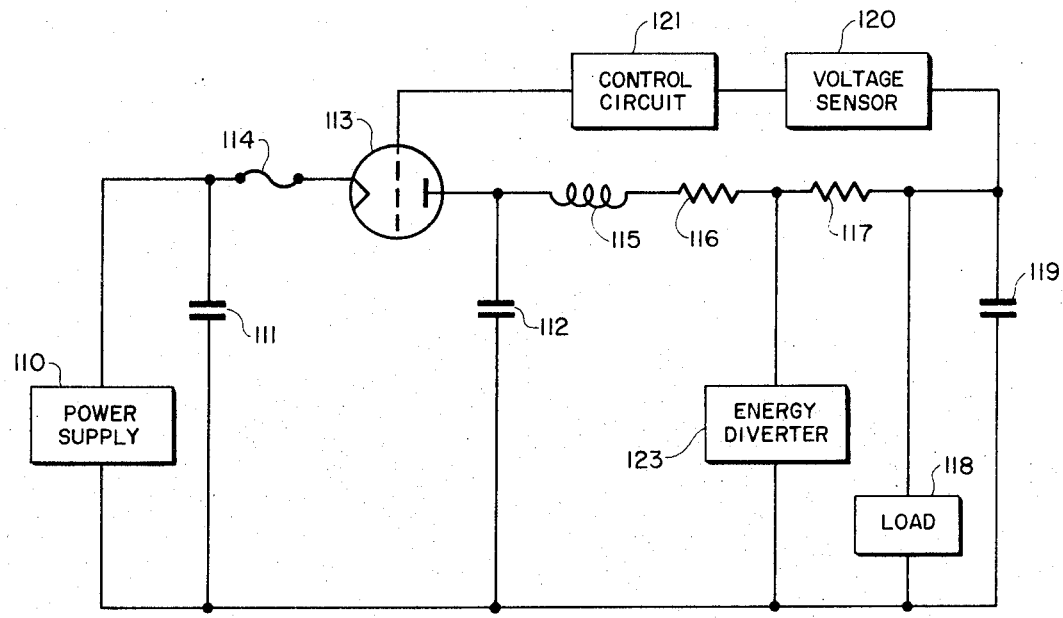
FIG. 1 shows a block and circuit diagram of the prior art using a vacuum tube control.

Referring now to FIG. 1, the prior art shows a main power supply 110 that energizes a main energy storage capacitor bank 111 which supplies a secondary capacitive energy storage capacitor bank 112 through a vacuum tube 113 and a conventional protective fuse 114. The secondary energy storage, capacitor bank is connected, through inductor 115 and resistor 116, to an energy diverter 123 and, through a resistor 117, to a load device 118 with an additional, tertiary, capacitive bank 119.

The vacuum tube is normally conducting to some degree even when the voltage across the tube is at a relatively low value. However, in the event of a short or an excessive current through the load 118, the vacuum tube can be cut off by means of a voltage sensor 120 and a control circuit 121, and the energy in the secondary and tertiary capacitor banks will be partially diverted through the conventional energy diverter 123 to minimize the potential damage to the pulse generating circuit. In this case, the vacuum tube may be held at cut off until the capacitor banks 112 and 119 are completely discharged and until the load recovers itself. At this time, the vacuum tube 113 can be turned on again to recharge the secondary and tertiary capacitor banks and resume pulse transmission.

Figure 2:
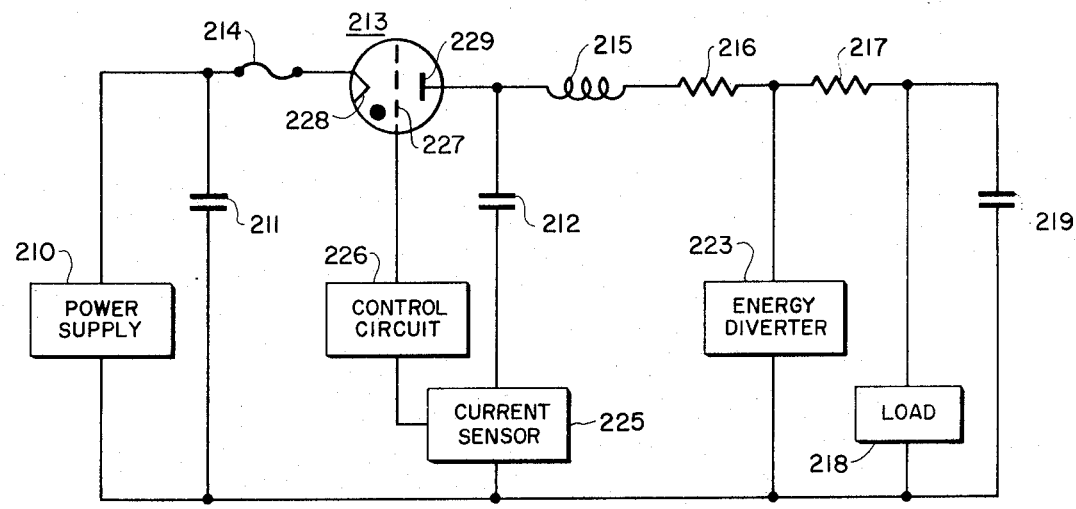
FIG. 2 is a block and circuit diagram of a typical example of this invention.

In FIG. 2, where similar elements are similarly numbered, a main power supply 210 energizes a main energy storage, capacitor bank 211 and an individual secondary energy storage capacitor bank 212 is charged from the main capacitor bank through a gaseous discharge tube 213 and a conventional protective fuse 214. An inductance 215 and a protective resistor 216 connect the secondary capacitor bank 212 to an energy diverter 223 and, through an additional resistor 217, to a load 218 and the additional, tertiary, energy storage, capacitor bank 219. A current sensor 225 and a control circuit 226 connect to the control grid 227 of the gaseous discharge tube 213.

In operation, the gaseous discharge tube, in a conducting state, charges the secondary capacitor bank 212 as well as the tertiary capacitor bank 219 from the main capacitor bank 211. However, as soon as the secondary capacitor bank 212 approaches the level of the main capacitor bank 211, the voltage across the anode and cathode electrodes 228 and 229 of the gaseous discharge tube drops below the level necessary to maintain conduction of the gaseous discharge tube and it extinguishes itself. It cannot conduct again until the voltage across its anode and cathode is sufficient for firing and, also, until it is ignited by a signal on its control grid 227.

In this gaseous discharge tube protective device the cutoff is automatic when the secondary and tertiary capacitor banks are charged and ready to energize the pulse transmitter load. The main power supply is isolated and protected during the actual firing of the individual pulse transmitter circuit whether there is a fault or not. Consequently neither the main power supply nor any other of the multiple pulse transmitter circuits is in any way affected by the firing or the faulting of any individual circuit.

Once the load circuit 218 has generated its pulse and the energy from the capacitor banks 212 and 219 has been discharged through the load the voltage of the main power supply appears across the anode and cathode electrodes and the gaseous discharge tube is ready to ignite. The current sensor 225 also senses the condition of the circuit and actuates the control circuit 226 which applies a pulse on the control grid 227. This ignites the gaseous discharge tube 213, which conducts again for whatever time is necessary to recharge the secondary and tertiary capacitor banks to the level whereat the gaseous discharge tube again extinguishes itself.

Any fault, or short circuit in the load circuit will normally occur during the actual pulse transmission and since the individual circuit is already disconnected from the main power supply, there can be no sudden flow of current, or possible interference with other units, or even momentary surges before the fuse can react.

In the event of a fault, however, the transmitting tube, or other circuit elements may breakdown. This makes the amount of energy drain from the secondary and tertiary capacitor banks substantially greater, and the duration of that drain substantially longer. Also, the transmitting tube may take a substantial amount of time to recover. If the current sensor is made sensitive to such a condition, the control circuit can be made to delay its igniting pulse to the gaseous discharge tube for two or more additional pulse cycles to give the faulted transmitting tube more time to recover itself.

The current sensor 225 may be any device, such as a current transformer, that is sensitive to a condition of, or change in the flow of, the current in the discharge path of the capacitor 212. The control circuit 226 may modify the signal from the current sensor, delay it if necessary, and amplify it to provide a signal of sufficient magnitude and duration for the positive ignition of the gaseous discharge tube. It will be obvious that many types of current sensors and variations in control circuitry will suggest themselves, to anyone skilled in the art, to meet the requirements of the circuitry and to accommodate the type of gaseous discharge tube that is being used.

The gaseous discharge tube may be any type of sufficient voltage and current-carrying capacity and other characteristics to function under the desired operating conditions.

The energy diverter is a protective device that is also used in the prior art. When the voltage across the load drops to zero, in the event of a failure or fault of the load, the voltage, and the considerable energy stored in the capacitor banks 212 and 219, will also appear across the energy diverter and will be divided between the load and the energy diverter, which diverts as much energy as possible from the shorting load, and absorbs that energy. The inductor 215 will reduce the buildup of current and the resistor 216 will limit the amount of current to both the energy diverter and the load in a well-known manner. The resistor 217 further reduces the amount of current through the load. The tertiary capacitor bank 219 normally will be substantially less in value than the secondary capacitor bank 212 and may not need series resistors or inductors as protective elements.

The power supply 210 can be of any well-known type that can provide sufficient voltage and current for the use intended. The capacitor banks 211, 212 and 219 are conventional. The load 218 can be an RF tube for pulse transmission and will have whatever typical control and coupling circuits, not shown, that are necessary for its proper functioning.

While the current sensor is shown in the discharge path of the secondary capacitor bank 212, between the capacitor and ground, it obviously could be put at other points in the circuit that could provide an indication of the termination of the pulse transmission or of a short circuit. It could, for example, be connected between the resistor 217 and the load 218.

In a typical embodiment of this invention, the main power supply of 25 kilovolts has a main capacitor bank of 24 microfarads. The gaseous discharge tube is a Hydrogen Thyratron No. 7890 of the General Electric Corporation. The secondary 212 and tertiary 219 capacitor banks are 6 and 0.25 microfarads, respectively. The inductor 215 may be provided by the residual inductance of the lines. The resistors 216 and 217 are of 1 and 10 ohms, respectively.

The energy diverter, current sensor, and control circuits are conventional, as is the load, which may be a transmitter for pulses of 50 microseconds with a duty cycle of 4 percent.

We wish it to be understood that we do not desire to be limited to the exact details of construction shown and described, for obvious modifications will occur to a person skilled in the art.

I claim:

1. An isolator and protector for a circuit comprising at least one pulse-generating circuit;

a main power supply and energy-storage means;

at least one, secondary, energy-storage means for said one pulse-generating circuit;

a gaseous-discharge tube having at least a cathode, an anode, and a control grid;

a means for connecting said cathode and said anode of said gaseous-discharge tube between said main power supply and energy-storage means, and said secondary, energy-storage means;

a means for connecting said pulse-generating circuit in the discharge path of secondary, energy-storage means;

a current sensing means, coupled to said discharge path of said secondary, energy-storage means, for sensing the completion of each of the pulses generated by said pulse-generating circuit, in the absence of a short circuit condition in said pulse-generating circuit;

and a control circuit connected to said current sensing means, and actuated by said current sensing means;

and control circuit being connected to said control grid to provide a signal for firing said gaseous-discharge tube after the completion of each of said pulses generated by said pulse-generating circuit;

said pulse-generating circuit having a low enough duty cycle to permit said gaseous-discharge tube to charge said secondary, energy-storage means from said main power supply and energy-storage means between pulses.

2. An isolator and protector for a circuit as in claim 1 having an energy diverter connected to said means for connecting said pulse-generating circuit in the discharge path of said secondary, energy-storage means, and in parallel with said pulse-generating circuit.

3. An isolator and protector for a circuit as in claim 1 wherein said means for connecting said pulse-generating circuit is in the discharge path of said secondary, energy-storage means comprises inductive and capacitive means, connected in series between said secondary, energy-storage means and said pulse-generating circuit.

4. An isolator and protector for a circuit as in claim 1 having a tertiary, energy-storage means connected in parallel with said pulse-generating circuit.

5. An isolator and protector for a circuit as in claim 4 wherein said energy-storage means comprise a main, capacitor bank, a secondary capacitor bank and a tertiary capacitor bank.

* * * * *